May 7, 1929.  P. J. CULLERTON  1,712,379
DOG RACING APPARATUS
Filed Sept. 18, 1926  3 Sheets-Sheet 1

Witness:
A. Burkhardt

Inventor:
Patrick J. Cullerton
By Cromwell, Greist & Warden
Attys.

May 7, 1929.  P. J. CULLERTON  1,712,379
DOG RACING APPARATUS
Filed Sept. 18, 1926  3 Sheets-Sheet 2
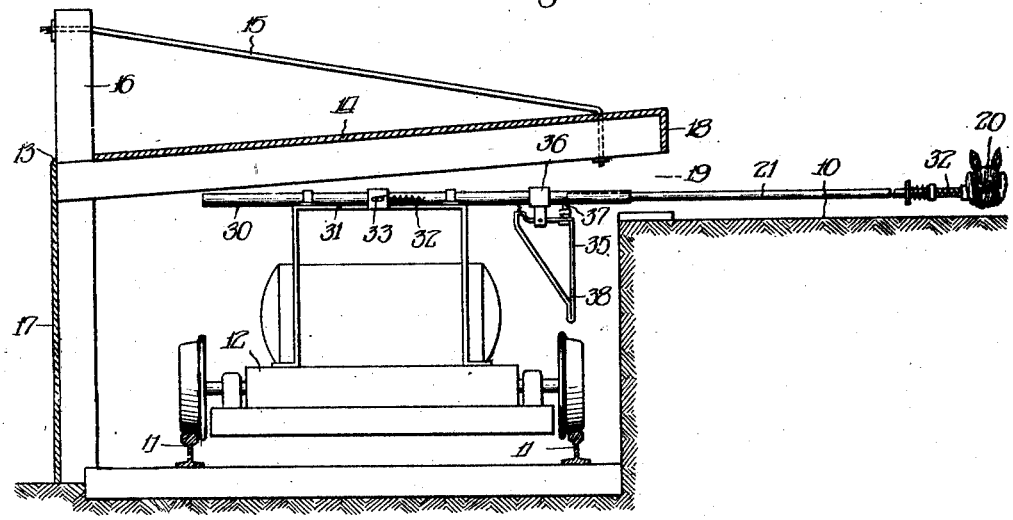
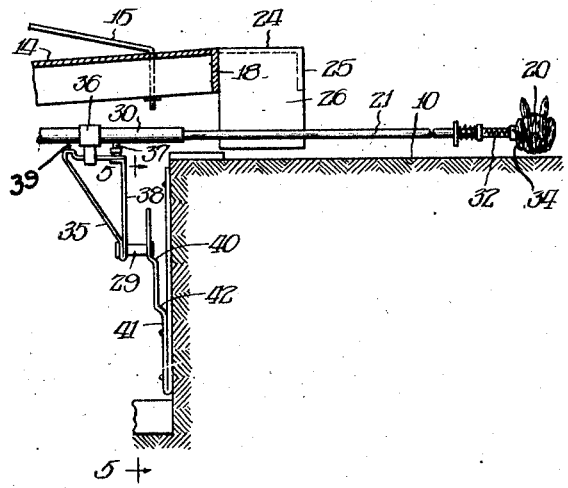
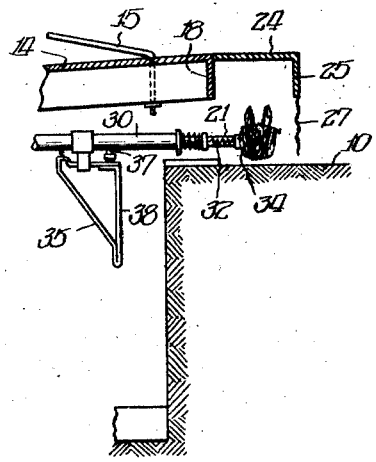
Witness:
R. Burkhardt
Inventor:
Patrick J. Cullerton,
By Cromwell, Trust & Warder
attys May 7, 1929.  P. J. CULLERTON  1,712,379
DOG RACING APPARATUS
Filed Sept. 18, 1926  3 Sheets-Sheet 3
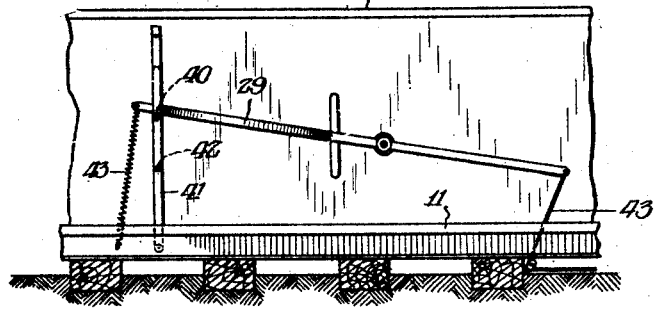
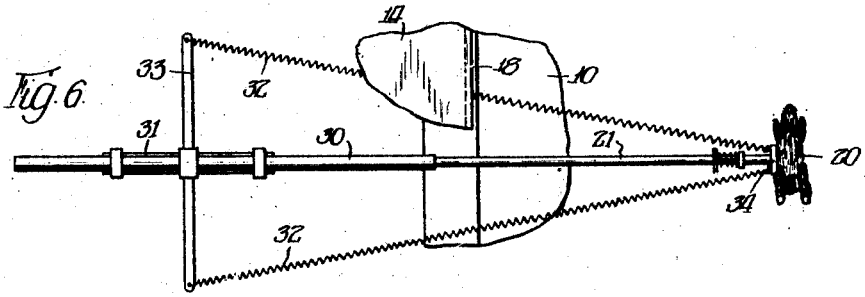
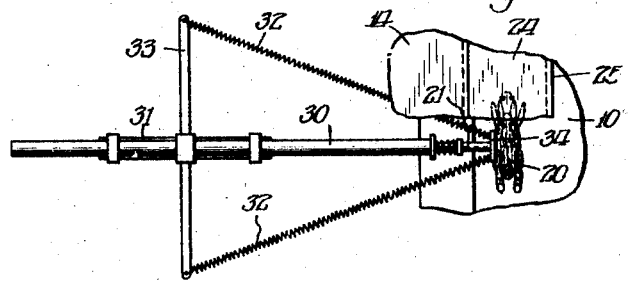
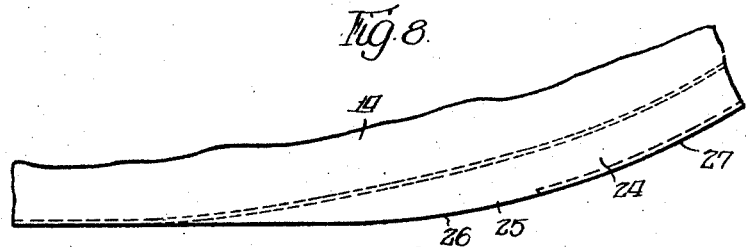
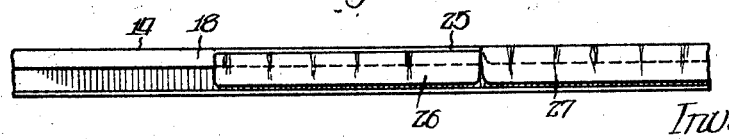
Witness:
P. Burkhardt
Inventor:
Patrick J. Cullerton,
by Cromwell, Greist & Warden
attys.

Patented May 7, 1929.

1,712,379

UNITED STATES PATENT OFFICE.

PATRICK J. CULLERTON, OF CHICAGO, ILLINOIS, ASSIGNOR TO ELECTRIC HOLDING CORPORATION, OF CHICAGO, ILLINOIS, A CORPORATION OF DELAWARE.

DOG-RACING APPARATUS.

Application filed September 18, 1926. Serial No. 136,244.

This invention has to do with the apparatus used in connection with dog racing, and is particularly concerned with the means employed for causing the artificial rabbit or other lure to escape at the completion of the race.

In dog racing, the dogs are lined up behind a barrier, and are released in pursuit of a rapidly moving artificial rabbit or other lure. The rabbit is carried about the course by means of a small electrically operated railway car, and is kept just ahead of the dogs by an operator who controls from a remote point the amount of current fed to the driving motor of the car. After the dogs have circled the course once, or have traveled any other predetermined distance, their relative positions are noted by the judges and the race is over.

The dogs, however, are still intent on getting the rabbit, and the problem is to dispose of the latter. Various methods have been tried, such as drawing a curtain across the course in front of the dogs, or switching the car onto a side track in order to carry the rabbit into a shelter out of sight of the dogs, but there have been certain objections to all such methods.

The principal object of this invention is to provide improved means for causing the rabbit to escape.

Other objects and advantages of the invention will be evident upon a full understanding of the construction, arrangement and operation of the apparatus.

One form of the invention is presented herein for the purpose of exemplification, but it will be appreciated that the invention is susceptible of embodiment in other structurally modified forms coming equally within the comprehensive scope of the appended claims.

In the accompanying drawings:

Fig. 2 is a vertical section through the rabbit-propelling mechanism, taken on the line 2—2 of Fig. 1;

Fig. 3 is a similar view, taken on the line 3—3 of Fig. 1;

Fig. 4 is a similar view, taken on the line 4—4 of Fig. 1;

Fig. 5 is a vertical section taken on the line 5—5 of Fig. 3;

Fig. 6 is a plan view of the arm which supports the rabbit, showing the arm in extended position, as in Fig. 2;

Fig. 7 is a similar view, showing the arm in retracted position, as in Fig. 4;

Fig. 8 is a fragmentary view of the railway track housing at the point where the extension to the roof of the housing commences; and Fig. 9 is a side view of that portion of the housing shown in Fig. 8.

Figure 1:
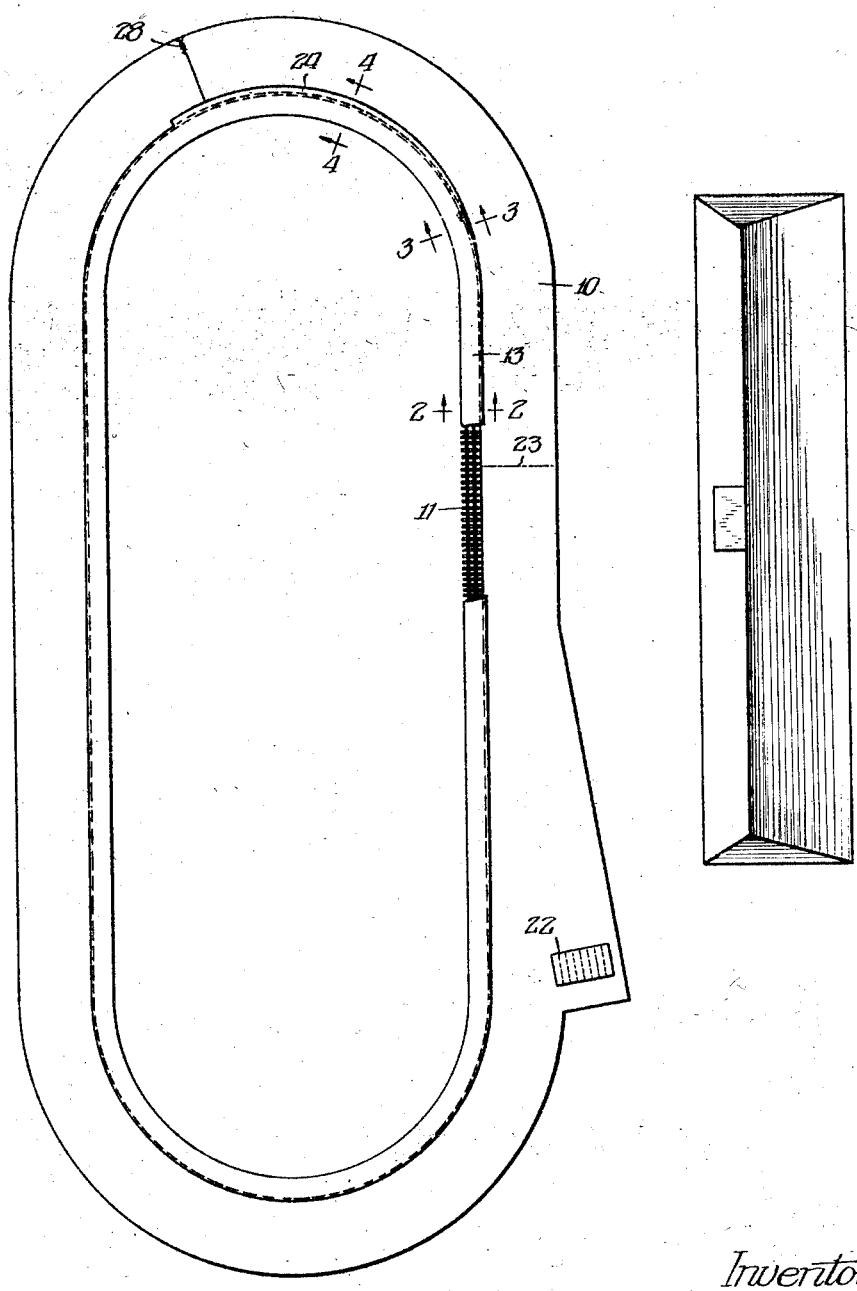
Fig. 1 is a plan view of a dog racing course constructed in accordance with the invention.

As will be observed in the drawings, the course 10 is in the form of an oval, and the narrow gauge railway track 11 about which the car 12 travels extends about the inner edge of the course. The track 11 is at a lower level than the course, and is covered over by a low housing 13. The roof 14 of the housing is supported by adjustable tie rods 15 from upright posts 16 arranged at intervals along the inner side wall 17 of the housing, and the outer edge 18 of the roof projects slightly over the inner edge of the course and is held by the tie rods 15 in such position as to leave a small opening 19 between the edge 18 of the roof and the course. The artificial rabbit 20 is mounted on an arm 21 which is carried by the car 12 and projects laterally out over the course through the opening 19 in the housing.

The dogs to be raced are placed in individual compartments provided in a starting box 22, and a barrier in the form of a single upwardly swinging or sliding door in the front of the box common to all of the compartments is raised to release the dogs in pursuit of the rabbit. Just prior to the release of the dogs, the rabbit is caused to travel about a portion of the course behind the barrier in order to attain the desired speed, and, when the rabbit reaches a position in front of the barrier, the dogs are released. The rabbit is caused to circle the course at a high rate of speed, and is kept a uniform distance ahead of the dogs by an operator who observes the relative positions of the rabbit and the dogs from an operating room located at some high point, such as at the top of a pavilion at one side of the course. After the rabbit and the dogs have lapped the course, the relative positions of the dogs are noted as they cross the finish line 23, and the race is over. The dogs, however, continue in pursuit of the rabbit, and this invention is concerned with the manner in which the rabbit is caused to disappear.

After the rabbit has passed the finish line 23 at the end of the race, it is caused to shift laterally into a position closely adjacent the edge 18 of the roof of the housing, and, while in such position, is carried into an escape tunnel formed by a narrow extension 24 on the edge of the roof. The front end of the extension 24 merges gradually into the edge 18 of the roof of the housing to avoid any abrupt abutments on the housing against which the dogs might injure themselves. The outer edge 25 of the extension is provided with two curtains 26 and 27 which depend therefrom; the curtain 26 being brushed aside momentarily by the rabbit as it enters the tunnel beneath the extension 24, and the curtain 27 serving as a blind to conceal the rabbit effectively from the dogs after entering the tunnel.

The dogs slow up when the rabbit disappears, and are brought to a stop by the presence of a curtain 28 drawn across the course. The curtain 28 is not necessary, but is desirable as it serves to herd the dogs together. During the race, the rabbit is not caused to shift laterally into a position closely adjacent the edge 18 of the roof when it approaches the extension 24, as after the completion of the race, but passes the extension outwardly of the same, the arm 21 brushing the curtains 26 and 27 upwardly as much as necessary in order to pass thereneath.

The means for causing the rabbit to shift laterally and enter the escape tunnel at a certain point in its travel after passing the finish line consists of a trip lever 29 which is pivoted beneath the housing to the wall formed by the inner edge of the course, as shown in Figs. 3 and 5. The arm 21 on which the rabbit is mounted is arranged to telescope into a tube 30 secured to a bracket 31 on the car 12, and two springs 32 tend to retract the arm into the tube. The springs 32 are connected on opposite sides of the arm and tube between the opposite ends of a cross member 33 on the tube and a rabbit-attaching plate 34 on the arm, and, in addition to retracting the rabbit at the desired time, serve to steady the arm after the fashion of stays during the rapid movement thereof about the course. During the race, the arm 21 is maintained in its extended position against the action of the springs 32 by means of a latch 35.

The latch 35 is pivoted to a bracket 36 on the tube 30, and is provided with a pin 37 which extends through an opening in the bottom of the tube and into a position against the end of the arm 21. Another portion 38 of the latch extends downwardly for coaction with the trip lever 29. The latch 35 is normally held in its operative position by means of a spring 39 which tends to maintain the pin 37 against the end of the arm 21.

When the car 12 approaches the trip lever 29, the lever presses the portion 38 of the latch 35 laterally and causes the pin 37 to withdraw from behind the end of the arm 21, whereupon the arm 21 is shifted laterally into the tube 30 by the springs 32 and into a position wherein the rabbit 20 will travel into the escape tunnel provided by the extension 24 on the roof of the housing. The engagement of the trip lever 29 with the latch 35 not only serves to permit retraction of the arm 21 by the springs 32, but also dislodges the lever 29 from a shoulder 40 formed in the bracket 41 supporting the lever, and, when the lever is thus dislodged, the camming portion thereof shifts downwardly against another shoulder 42 in the bracket 41 under the influence of a spring 43, in which latter position the camming portion of the lever 29 is out of the path of the portion 38 of the latch 35 and will not trip the latch when the car 12 again passes that point on the track 11. The trip lever 29 is thus automatically rendered inoperative after it causes retraction of the arm 21, and is re-set manually by pulling on a rope 43, but only after the car 12 has passed that point on the track during the first part of the next race.

I claim:

1. In dog racing apparatus, a guide rail arranged along one side of the course, a carriage mounted on the rail, an arm projecting from the carriage over the course for carrying a lure, an escape tunnel arranged along a portion of one side of the course, and means for shifting the arm with the lure thereon laterally relative to the carriage into a position wherein the lure will travel into the escape tunnel.

2. In dog racing apparatus, a guide rail arranged along one side of the course, a carriage mounted on the rail, an arm projecting from the carriage over the course for carrying a lure, an escape tunnel arranged along a portion of one side of the course, and means for automatically shifting the arm with the lure thereon laterally relative to the carriage at a predetermined point in the course into a position wherein the lure will travel into the escape tunnel.

3. In dog racing apparatus, a guide rail arranged along one side of the course, a carriage mounted on the rail, an arm projecting from the carriage over the course for carrying a lure, an escape tunnel arranged along a portion of one side of the course, means for automatically moving the arm with the lure thereon laterally at a predetermined point in the course into a position wherein the lure will travel into the escape tunnel, and means for automatically rendering said last mentioned means inoperative after it has functioned.

4. In dog racing apparatus, a housing along one edge of the course, a track within the housing, an electric car mounted on the track, an arm projecting laterally from the car through a slot in the housing for carrying a lure, an escape tunnel arranged along a portion of the slotted edge of the housing, means tending to retract the arm to a position wherein the lure will travel in the escape tunnel, a latch associated with the arm for preventing such retraction, and means for releasing the latch at a predetermined point in the travel of the car.

5. In dog racing apparatus, a housing along one edge of the course, a track within the housing, an electric car mounted on the track, a two-part telescopic arm projecting laterally from the car through a slot in the housing for carrying a lure, means tending to retract one portion of the arm within the other, a latch associated with the arm for preventing such retraction, and means for automatically releasing the latch at a predetermined point in the travel of the car.

6. In dog racing apparatus, a housing along one edge of the course, a track within the housing, an electric car mounted on the track, a retractable arm projecting laterally from the car through a slot in the housing for carrying a lure, two coil springs arranged on opposite sides of the arm for retracting the same, a latch associated with the arm for preventing such retraction, and means for releasing the latch at a predetermined point in the travel of the car.

7. In dog racing apparatus, a housing along one edge of the course, a track within the housing, an electric car mounted on the track, a retractable arm projecting laterally from the car through a slot in the housing for carrying a lure, two outwardly converging coil springs arranged on opposite sides of the arm for retracting the same, a latch associated with the arm for preventing such retraction, and means for automatically releasing the latch at a predetermined point in the travel of the car, said means upon functioning being rendered inoperative to again release the latch until manually re-set.

8. In dog racing apparatus, a housing along one edge of the course, a track within the housing, an electric car mounted on the track, an arm projecting from the car over the course for carrying a lure, an extension to the housing projecting over the course throughout a portion of the length thereof, a curtain hanging from the edge of the extension, and means operable at will when the car passes a certain point on the track for causing the arm with the lure thereon to move laterally and ride beneath the extension and behind the curtain, whereby to conceal the lure from the dogs.

9. In an animal race course, in combination with a housed track, a lure carriage movable over said track, a shaft, means supporting said shaft for transverse sliding movement on said carriage, a lure carried by the outer end of said shaft, releasable means for holding the lure in extended position beyond said housing, and means for laterally moving the shaft and lure to retracted position within the housing when said holding means is released.

10. In an animal race course, in combination with a housed track, a lure carriage movable over said track, a shaft, means supporting said shaft for transverse sliding movement on said carriage; a lure carried by the outer end of said shaft, and means for laterally moving the shaft and lure to retracted position within the housing.

In testimony whereof I have hereunto subscribed my name.

PATRICK J. CULLERTON.